(No Model.)
J. TODD.
CUT-OFF FOR BOLTING CHESTS.
No. 303,764. Patented Aug. 19, 1884.
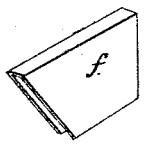
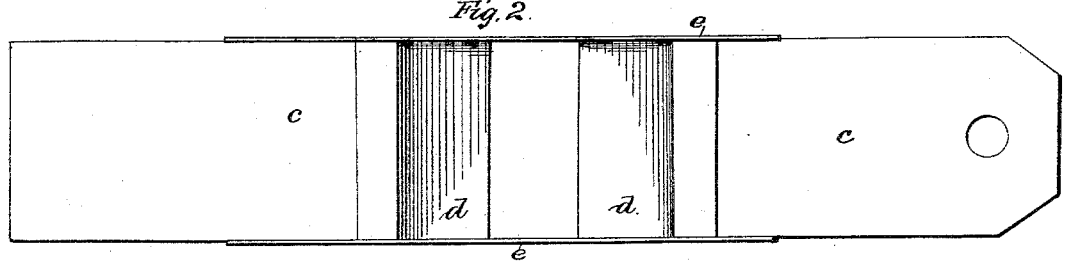
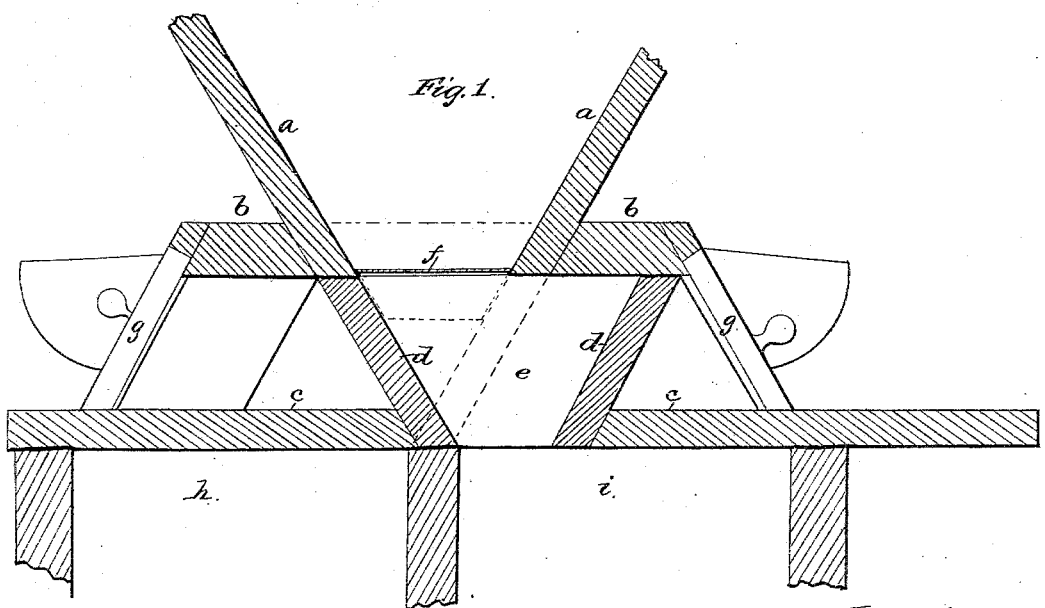
Attest:
W. E. Chaffee
J. P. Powu
Inventor:
John Todd,
by O. B. Brock,
Atty.

UNITED STATES PATENT OFFICE.

JOHN TODD, OF LEWISTOWN, PENNSYLVANIA.

CUT-OFF FOR BOLTING-CHESTS.

SPECIFICATION forming part of Letters Patent No. 303,764, dated August 19, 1884.

Application filed April 12, 1884. (No model.)

*To all whom it may concern:*

Be it known that I, JOHN TODD, a citizen of the United States, residing at Lewistown, in the county of Mifflin and State of Pennsylvania, have invented certain new and useful Improvements in Cut-Offs for Bolting-Chests; and I do hereby declare the following to be a full, clear, and exact description of the invention, such as will enable others skilled in the art to which it appertains to make and use the same.

Figure 1 represents a central vertical section showing my improvement. Fig. 2 is a plan view of one of the feed-slides or cut-offs, and Fig. 3 is a detailed perspective view, hereinafter referred to.

My invention relates to cut-offs for bolting-chests; and the improvement consists in the following construction and arrangement, the points of novelty of which are set forth in the claim.

The present invention is an improvement upon a former device for accomplishing the same object, and for which application was made January 30, 1884.

In the accompanying drawings, $a$ represents the hopper-boards of the bolting-chest, which are located beneath the reel. (Not shown.) The boards $a$ are secured to the pieces $b$, which form the upper walls of the cut-off slides.

$c$ represents the cut-off slides, each of which is capable of independent operation.

$d$ are the inclined end walls, arranged as shown, whereby the flour products may be changed from one conveyer to the other by the longitudinal movement of the valve.

$e$ are the vertical side walls of the valve or cut-off. Each valve has a partition or wall at either side. These partitions are made of thin sheet-iron, and the adjacent walls of each valve contact each other.

$f$ is a saddle-piece, made of sheet-iron, and rigidly secured in any suitable way to the hopper-boards $a$, and embraces the contiguous partitions $e$ between it. This saddle-piece projects below the lower end of the hopper-boards, where it acts as an effectual stop to the forward and backward movements of the slides. This construction economizes a great deal of space and effectually prevents any leakage of the flour products between the series of valves.

$g$ are doors for closing the openings made by the introduction of the valves.

$h$ and $i$ are the conveyer-troughs, arranged beneath the cut-offs so that the flour products may be changed from one conveyer to the other at pleasure by the operation of the valves.

It will be seen that by the employment of cut-offs having thin sheet-iron sides a great saving in space is obtained; and further, that by the employment of the saddle-pieces between the valves a very efficient means is at the same time secured to prevent any leakage of the flour, or any clogging of the valves in their movements.

I claim—

The combination, in a cut-off for flour-bolting apparatus, of a slide having the converging sides $d$ $d$, the converging hopper-boards $a$, and a saddle-piece, $f$, straddling the sides of the slides and projecting below the edges of the boards $a$, thereby forming a stop to arrest the movement of the slide in either direction, substantially as described.

In testimony whereof I affix my signature in presence of two witnesses.

JOHN TODD.

Witnesses:
AMBROSE D. HUMMEL,
LA FAYETTE WEBB.